(12) United States Patent  
Meyer et al.

(10) Patent No.: US 7,296,994 B2  
(45) Date of Patent: Nov. 20, 2007

(54) CEMENT CLINKER PRODUCTION COMPRISING PARTIAL REMOVAL OF A FLOW OF ROTARY KILN EXHAUST GAS CONTAINING HARMFUL SUBSTANCES

(75) Inventors: Hans-Wilhelm Meyer, Langenzenn (DE); Norbert Streit, Siegburg (DE); Carsten Eckert, Köln (DE)

(73) Assignee: KHD Humboldt Wedag GmbH, Cologne (DE)

( * ) Notice: Subject to any disclaimer, the term of this patent is extended or adjusted under 35 U.S.C. 154(b) by 0 days.

(21) Appl. No.: 10/587,087

(22) PCT Filed: Jan. 19, 2005

(86) PCT No.: PCT/EP2005/000476

§ 371 (c)(1),  
(2), (4) Date: Apr. 4, 2007

(87) PCT Pub. No.: WO2005/070845

PCT Pub. Date: Aug. 4, 2005

(65) Prior Publication Data

US 2007/0178418 A1 Aug. 2, 2007

(51) Int. Cl.  
*F27B 15/12* (2006.01)

(52) U.S. Cl. .............................. 432/58; 432/16

(58) Field of Classification Search ............ 432/16, 432/18, 58, 106  
See application file for complete search history.

(56) References Cited

U.S. PATENT DOCUMENTS

| | | | | |
|---|---|---|---|---|
| 4,071,309 A | * | 1/1978 | Yamane | 432/14 |
| 6,685,117 B2 | * | 2/2004 | Poeschl | 241/48 |
| 6,855,302 B2 | * | 2/2005 | Eckert et al. | 423/210 |
| 6,902,714 B2 | * | 6/2005 | Skaarup Jensen et al. | 423/244.09 |

FOREIGN PATENT DOCUMENTS

| | | |
|---|---|---|
| DE | 34 03 449 | 8/1985 |
| DE | 27 24 372 | 2/1986 |

OTHER PUBLICATIONS

Pamphlet "Drehrohrofenanlagen" (Rotary tubular kiln plants), No. 8-100d of KHD Humboldt Wedag AG, pp. 10-11, May 1984.

* cited by examiner

*Primary Examiner*—Gregory Wilson  
(74) *Attorney, Agent, or Firm*—Greer, Burns & Crain Ltd

(57) ABSTRACT

The aim of the invention is to create a bypass system for a cement clinker production line, which is characterized by particularly low investment costs and operating costs, thus being economically favorable. Said aim is achieved by installing the bypass system in such a way that the capacity of pre-existing system filters such as the main exhaust gas filter and/or the cooler exhaust filter can also be used for treating the bypass gas flow.

12 Claims, 2 Drawing Sheets

CEMENT CLINKER PRODUCTION COMPRISING PARTIAL REMOVAL OF A FLOW OF ROTARY KILN EXHAUST GAS CONTAINING HARMFUL SUBSTANCES

BACKGROUND OF THE INVENTION

The invention relates to a method for the production of cement clinker from raw cement meal which is preheated in at least one heat exchanger string, through which the exhaust gas from a rotary tubular kiln flows, and is burnt in the sintering zone of the rotary tubular kiln to form cement clinker which is cooled in a following cooler, comprising the removal of a partial hot flow (bypass gas flow) of the rotary kiln exhaust gas, said partial flow being laden with dust loads and/or gaseous/vaporous harmful substances inclined to cause cakings, comprising the cooling of the bypass gas flow in a mixing chamber and comprising the following separation of dust containing harmful substances from the cooled bypass gas flow. The invention relates, moreover, to a plant for carrying out the method.

In the production of cement clinker from raw cement meal, it is known that many batch materials, such as raw cement meals, but also many fossil fuels used, contain secondary constituents, such as, for example, alkali compounds, chlorine, sulfur compounds, heavy metals, etc., which, in the region of the sintering zone of the rotary tubular kiln, evaporate, for example, as alkali chloride compounds and alkali sulfate compounds, condense/crystallize again in the preheater region of the cement clinker production line and thus build up circulations, with the result that both the quality of the cement clinker may be adversely influenced and the combustion process itself may be disturbed considerably.

To suppress such circulations in a cement clinker production line and to reduce the content of circulation-forming materials in the clinker production process, it is known, for example from the pamphlet "Drehrohrofenanlagen" ["Rotary tubular kiln plants"], No 8-100d of K H D Humboldt Wedag A G, pages 10/11, of May 1984, by means of what is known as bypass gas removal, to branch off part of the hot dust-laden kiln exhaust gases containing the volatile compounds out of the lower region of the rotary kiln exhaust gas riser line or directly out of the rotary kiln entry chamber, to cool them in a mixing chamber by the introduction of external air, to cause the vaporous harmful substances contained in the bypass gas flow to condense on the entrained solid particles and then to clean the cooled bypass gas flow by the separation of the dust containing harmful substances in a specific dust separator. In order to ensure that the volumes of the bypass gas flow that are to be treated and its dedusting devices do not become too large, it is also known not only to mix external air as a cooling medium into the bypass gas flow, having a temperature of, for example, 1150° C., but also to inject water which is intended to assist the shock cooling of the bypass gas flow.

Furthermore, DE-C-27 24 372 discloses a cement clinker production line comprising the removal of a bypass gas flow which is cooled in a mixing chamber, apart from injected water, not in this case by means of fresh air, but by means of a partial flow of the production exhaust gas or system exhaust gas which has already been cleaned in an electric separator. This partial exhaust gas flow already cleaned in the system filter, however, is laden with dust again in the mixing chamber of the bypass gas flow, at least this partial exhaust gas flow then having to be cleaned a second time in the separate bypass gas flow dust filter, so that the known cement clinker production comprising bypass gas removal takes up relatively large filter volumes, along with the associated high investment and operating costs.

In cement clinker production, there are increasing bypass problems, because, in cement clinker production, both Western industrial nations and emerging and developing countries increasingly use chlorine-laden and sulfur-laden waste fuels and residual materials as what are known as secondary fuels. Many operators of cement clinker production lines therefore attempt to lower the circulation level of volatile components (in particular, chlorine and sulfur) to a tolerable level by locking out the system filter dust. However, they shy away from installing a separate bypass system which incurs considerable investment and operating costs for additional dedusting devices, mostly electrostatic dust separators, dust transports and fans. To be precise, as a rule, the mixed bypass gas flows occurring as a result of the supply of large bypass cooling air quantities are so great that they cannot be treated in already existing electrostatic dust separators in addition to the already existing quantities of system exhaust gases.

SUMMARY OF THE INVENTION

The object on which the invention is based is, in a cement clinker production line, to provide a bypass gas system which is distinguished by particularly low investment and operating costs and is therefore beneficial in economic terms.

[This object is achieved according to the invention, in method terms, by means of a method having the measures of claim 1 and, in device terms, by means of a plant having the features of claim 6. Advantageous refinements of the invention are specified in the sub claims.]

In the bypass gas system according to the invention, it is not fresh air which is introduced into the mixing chamber for cooling the bypass gas flow, but, instead, at least one removed partial flow of the system exhaust gas already present in the cement clinker production line is introduced in the non-dedusted state, that is to say prior to dedusting in the existing system filter, into the mixing chamber and is utilized there for cooling the bypass gas flow. In this case, the system exhaust gas utilized as cooling medium for the bypass gas flow may be the exhaust gas from the raw-meal heat exchanger string and/or the residual exhaust air from the clinker cooler which is already present and is no longer utilizable in the cement clinker production line itself and/or the exhaust gases from a mill-drying plant operated by means of exhaust gases from the heat exchanger string. All these non-dedusted system exhaust gas flows connected to already existing system filters are suitable for cooling the bypass gas flow. The necessary residual cooling of the mixed bypass gas is ensured by water injection, thus resulting in only an insignificant additional gas volume due to water vapor. Downstream of the partial system gas flow extraction, the mixed gas flow removed from the mixing chamber of the bypass gas flow cooling is then returned into the system gas again, likewise upstream of the system filter, which then dedusts the system exhaust gas of the bypass gas flow. By the removal of a partial flow of the system exhaust gas having a temperature of, for example, 300° C., by utilization as a cooling medium in the mixing chamber of the bypass gas flow and by the return of the mixed gas into the system exhaust gas again upstream of its system filter, the gas quantity to be dedusted is increased only insignificantly, as compared with operation without a bypass system. In other words: the bypass gas system according to the invention makes it possible also to utilize the capacity of already existing system filters for the treatment of the bypass gas flow.

It has been shown that, in the bypass gas system according to the invention, as compared with operation without a bypass system, the exhaust gas quantity to be dedusted is increased only insignificantly, to be precise by about 3 to 4%, due merely to the increased supply of heat energy to the calcinator and to the gas quantity arising from water evaporation. Such a slight increase in the overall gas quantity often lies within the capacity reserves of the already existing filters and exhaust gas fans of the cement clinker production line or is advantageous if an insignificantly lower output is allowed for, as compared with a high investment sum.

An additional water cooling of the bypass exhaust gases in the mixing chamber from, for example, 1250° C. to, for example, 800° C. contributes to reducing the exhaust gas quantity, the mixing chamber dimension and the fan size.

The efficient bypass gas system according to the invention of a cement clinker production line can be implemented for bypass operation with an up to 10% bypass in any event, that is to say, at least up to this order of magnitude of bypass gas removal, it is possible also to utilize the capacity of an already existing system filter for the treatment of the bypass gas flow, thus dispensing with the installation of a separate bypass gas flow dedusting plant, as may be gathered from the numerical example given at the end of the description.

BRIEF DESCRIPTION OF THE DRAWINGS

The invention and its further features and advantages are explained in more detail with reference to the exemplary embodiments illustrated diagrammatically in the figures in which.

DETAILED DESCRIPTION OF THE DRAWINGS

Figure 1:
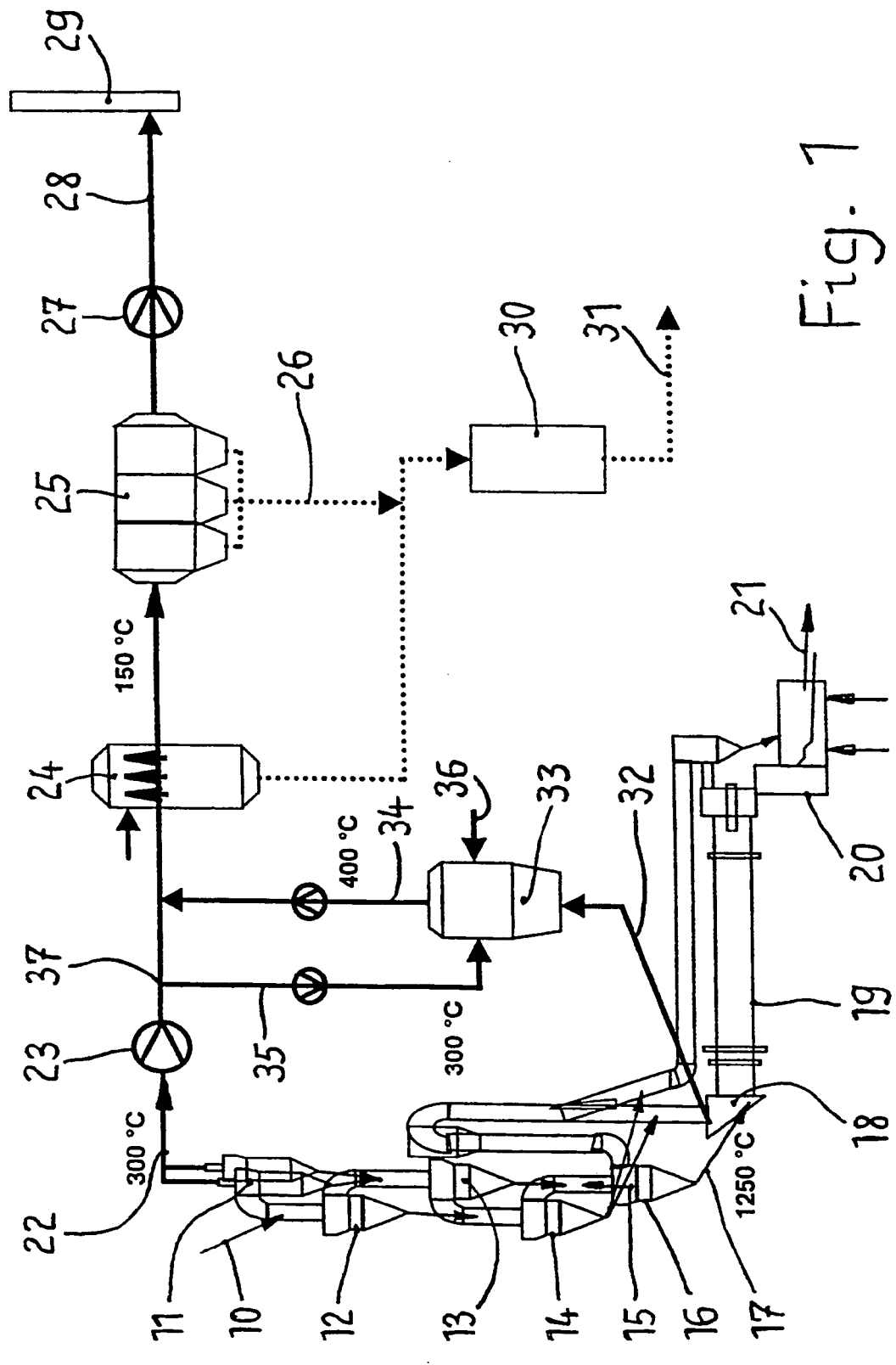
FIG. 1 shows the flow diagram of a cement clinker production line with dedusting of the bypass gas flow via the system filter.

In the cement clinker production line of FIG. 1, raw cement meal 10 is fed at the top into a raw-meal preheater where it travels successively through the cyclone suspension gas heat exchangers 11, 12, 13, 14 in combined concurrent/countercurrent with respect to the hot exhaust gas 15 of a precalcination stage, in order to be separated from the hot exhaust gas flow 15 in the lowermost cyclone 16 and introduced as high-grade (for example, 95%)-calcinated raw cement meal 17 into the entry chamber 18 of the rotary tubular kiln 19, in the sintering zone of which it is burnt to form cement clinker which is subsequently cooled in a clinker cooler 20, for example a grate cooler. The cooled cement clinker leaves the cooler 20 at 21.

The system exhaust gas cooled on the raw cement meal leaves the raw-meal preheater at the top at 22 with a temperature of about 300° C. This exhaust gas is introduced via a suction-draft blower 23 into a spray tower 24, is conditioned there by water injection with evaporation cooling and, cooled to approximately 150° C., is freed of dust 26 in a system filter 25, as a rule by the electrostatic dust separator, and is subsequently removed as cleaned system exhaust gas 28 via a further exhaust gas fan 27 by way of a main chimney 29. The dust collected in the spray tower 24 and in the system filter 25 is supplied via a dust bunker 30, by way of a conveying line 31, to the cement clinker milling plant, not illustrated.

From the entry chamber 18 of the rotary tubular kiln 19, for example, approximately 10% of the rotary kiln exhaust gas quantity is removed as a bypass gas flow 32 having a temperature of about 1250° C. and with a dust load of approximately 200 g/Nm$^3$. The bypass gas flow 32 is cooled in a mixing chamber 33, specifically to a mixed gas 34 of about 400° C., the cooling medium used in the mixing chamber 33 not being fresh air, but, instead, a partial flow 35 of the non-dedusted system exhaust gas 22 already present in the cement clinker production line, that is to say at least a partial flow of the non-dedusted system exhaust gas 22 is utilized as a cooling medium for the hot bypass gas flow 32. By water 36 being injected into the mixing chamber 33, the temperature of the mixed gases 34 leaving the mixing chamber 33 is able to be lowered even further, for example to 300° C. Downstream of the partial system gas flow extraction 37, the mixed gas flow 34 removed from the mixing chamber is returned into the system exhaust gas again, likewise upstream of the system filter 25 or of the spray tower 24 preceding the latter.

Figure 2:
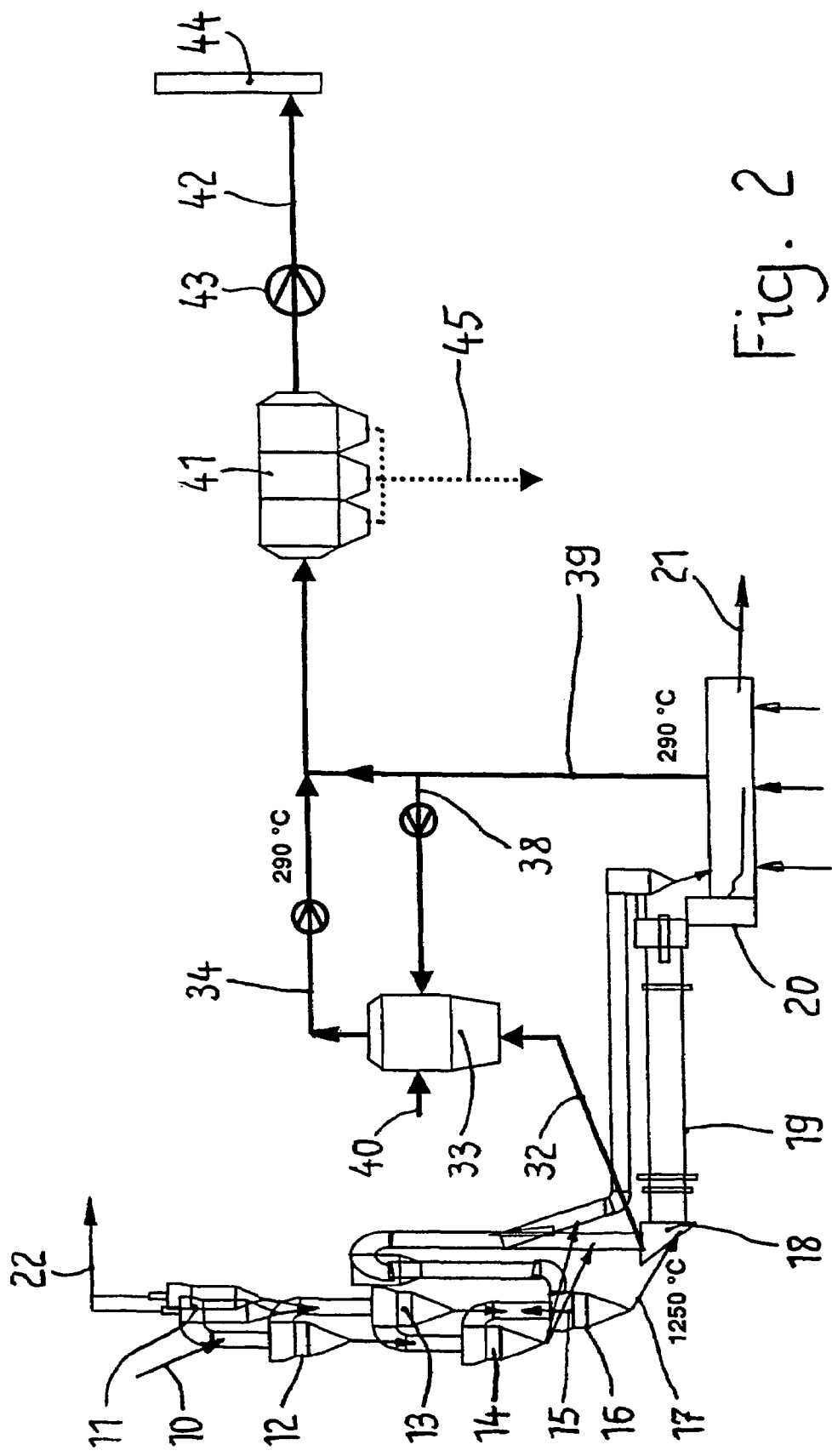
FIG. 2 shows the flow diagram of a cement clinker production line with dedusting of the bypass gas flow via the filter of the cement clinker cooler.

In the cement clinker production line of the exemplary embodiment of FIG. 2, the bypass gas flow 32 removed from the entry chamber 18 of the rotary tubular kiln 19 and having a temperature likewise of approximately 1250° C. and a dust load likewise of 200 g/Nm$^3$ is likewise cooled in a mixing chamber 33, the cooling medium used in the mixing chamber 33 being a partial flow 38 of the residual exhaust air 39 from the clinker cooler 20 already present and no longer utilizable in the cement clinker production line itself and having a temperature of about 260° C. Water 40 is also injected as a further medium into the mixing chamber 33. Here, too, downstream of the clinker cooler partial exhaust air flow extraction, the mixed gas flow 34 removed from the mixing chamber 33 is returned into the cooler exhaust air 39, likewise upstream of the system filter 41, that is to say the grate cooler filter. The cleaned grate cooler exhaust air 42 is supplied to a chimney 44 via a fan 43, while the dust 45 collected in the cooler filter 41 is likewise delivered to the cement clinker milling plant.

It has been shown that, when the bypass gas system according to the invention is in operation, as compared with the cement clinker production line without a bypass, exhaust gas quantities increased by only about 3.7% to about 5% are obtained which can be absorbed by capacity reserves on the existing system filter or the existing cooler filter of a cement clinker production line, specifically calculated for a 10% bypass, sufficient in most cases, of a cement clinker production line with a modern precalcinator, in which approximately 60% of the fuel requirement necessary for the overall process is burnt, with the production output of 4500 t of cement clinker per day, without the installation of a separate specific dedusting plant being necessary for the bypass gas flow.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A method for the production of cement clinker from raw cement meal comprising the steps of:
   preheating the raw cement meal in at least one heat exchanger string by directing a flow of exhaust gas from a rotary tubular kiln through the heat exchanger string and towards a system filter,
   burning the raw cement meal in a sintering stage of the rotary tubular kiln to form cement clinker, cooling the cement clinker in a cooler following the tubular kiln, removing a partial hot flow of the rotary kiln exhaust gas as a bypass gas flow prior to the exhaust gas passing though the system filter, the bypass gas flow being laden with at least one of dust loads, gaseous harmful substances and vaporous harmful substances, introducing the bypass gas flow into a mixing chamber, extracting at least one partial stream of the non-dedusted system exhaust gas present in the cement clinker production line at a location upstream of the system filter, cooling the bypass gas flow in the mixing chamber by the introduction into the mixing chamber of the partial stream of exhaust gas to form a mixed gas flow, removing the mixed gas flow from the mixing chamber and returning the mixed gas flow into the system exhaust gas flow, downstream of the partial exhaust gas flow extraction location and upstream of the system filter, and thereafter, separating dust containing harmful substances from the cooled bypass gas flow.

2. The method as claimed in claim 1, wherein the partial stream of exhaust gas comprises exhaust gas from the raw meal preheater/heat exchanger string.

3. The method as claimed in claim 1, wherein the partial stream of exhaust gas comprises residual exhaust air from the clinker cooler.

4. The method as claimed in claim 1, wherein the partial stream of exhaust gas comprises exhaust gases from a mill-drying plant operated by means of exhaust gases from the heat exchanger string.

5. The method as claimed in claim 1, wherein the mixed gas flow removed from the mixing chamber is returned into the system exhaust gas string upstream of a spray tower preceding the system filter.

6. A plant for the production of cement clinker from raw cement meal, comprising a rotary tubular kiln, at least one heat exchanger string, through which the raw cement meal passes towards the rotary tubular kiln in a material flow direction, and through which the exhaust gas from the rotary tubular kiln flows in a gas flow direction, a clinker cooler following the rotary tubular kiln in the material flow direction, a bypass gas removal arrangement for the removal of a partial flow of the rotary kiln exhaust gas as a bypass gas flow, a mixing chamber arranged to receive the bypass gas flow, a partial flow line branched off from one of the exhaust gas line of the heat exchanger string and the clinker cooler at an extraction point upstream of a filter in the gas flow direction, the partial flow line being connected to the mixing chamber to introduce an extracted partial flow of exhaust gas into the mixing chamber to provide a cooled mixed gas, a line connecting the mixing chamber to the exhaust gas line at a connection point downstream of the extraction point in the gas flow direction and upstream of the filter in the gas flow direction to introduce the cooled mixed gas into the exhaust gas line, and a system filter to separate dust containing harmful substances from the cooled bypass gas flow.

7. A plant according to claim 6, wherein the filter comprises the system filter.

8. A plant according to claim 6, wherein the filter comprises a clinker cooler filter.

9. A plant according to claim 6, wherein the extraction point is located in the heat exchanger string.

10. A plant according to claim 6, wherein the extraction point is located at the clinker cooler.

11. A plant according to claim 6, including a mill drying plant and the extraction point is located at the mill drying plant.

12. A plant according to claim 6, including a spray tower preceding the system filter in the gas flow direction and the connection point is upstream of the spray tower in the gas flow direction.

* * * * *